(12) United States Patent
Erell (10) Patent No.: US 6,611,801 B2
(45) Date of Patent: Aug. 26, 2003

(54) GAIN AND NOISE MATCHING FOR SPEECH RECOGNITION

(75) Inventor: Adoram Erell, Herzlia (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/233,493

(22) Filed: Sep. 4, 2002

(65) Prior Publication Data

US 2003/0004712 A1 Jan. 2, 2003

Related U.S. Application Data

(63) Continuation of application No. 09/226,535, filed on Jan. 6, 1999, now Pat. No. 6,466,906.

(51) Int. Cl.[7] ............................ G10L 15/04; G10L 15/06
(52) U.S. Cl. ........................................ 704/233; 704/234
(58) Field of Search ................................ 704/226–228, 704/231, 233, 234, 244, 251–253

(56) References Cited

U.S. PATENT DOCUMENTS

| | | | | |
|---|---|---|---|---|
| 4,489,434 A | * | 12/1984 | Moshier | 704/252 |
| 4,882,757 A | * | 11/1989 | Fisher et al. | 704/251 |
| 5,386,492 A | * | 1/1995 | Wilson et al. | 704/252 |
| 5,842,162 A | * | 11/1998 | Fineberg | 704/233 |
| 6,466,906 B2 | * | 10/2002 | Erell | 704/234 |

OTHER PUBLICATIONS

"Annex B: A Silence Compression Scheme for G.729 Optimized for Terminals Conforming to Recommendation V.70", International Telecommunication Union, Nov. 1996, pp. 1–16.

B. Patrick Landell, Robert E. Wohlford and Lawrence G. Bahler, "Improved Speech Recognition in Noise", ICASSP 86, Tokyo, 1986, pp. 749–751.

Tom Class and Dirk Van Compernolle, "SNR–Normalisation for Robust Speech Recognition", ICASSP 96, 1996, pp. 331–334.

(List continued on next page.)

Primary Examiner—David D. Knepper
(74) Attorney, Agent, or Firm—Eitan, Pearl, Latzer & Cohen Zedak, LLP.

(57) ABSTRACT

A speech recognition system includes a token builder, a noise estimator, a template padder, a gain and noise adapter and a dynamic time warping (DTW) unit. The token builder produces a widened test token representing an input test utterance and at least one frame before and after the input test utterance. The noise estimator estimates noise qualities of the widened test token. The template padder pads each of a plurality of reference templates with at least one blank frame either the beginning or end of the reference template. The gain and noise adapter adapts each padded reference template with the noise and gain qualities thereby producing adapted reference templates having noise frames wherever a blank frame was originally placed and noise adapted speech where speech exists. The DTW unit performs a noise adapted DTW operation comparing the widened token with one of the noise adapted reference templates, wherein, when comparing against one of the noise frames, no duration constraints are used. The present invention includes the method performed by the system.

18 Claims, 7 Drawing Sheets

OTHER PUBLICATIONS

Ilan D. Shallom, Raziel Haimi–Cohen and Tai Gorlan, "Dynamic Time Warping with Boundries Constraint Relaxation", IEEE Conference in Israel, 1989, pp. 1–4.

Richard C. Rose and Douglas B. Paul, "A Hidden Markov Model Based Keyword Recognition System", CH2847–2/90/0000–0129, IEEE, 1990, p. 129.

Olli Vlikki and Kari Laurila, "Noise Robust HMM–Based Speech Recognition Using Segmental Cepstral Feature Vector Normalization", ESCA–NATO Workshop on Robust Speech Recognition for Unknown Communication Channels, 1997, pp. 107–110.

Herve Bourlard, Bart D'hoore and Jean–Marc Bolte, "Optimizing Recognition and Rejection Performance in Word–spotting Systems", 0–7803–1775–0/94, IEEE 1994, p. I–373.

Mellor & Varga, "Noise Masking in Transform Domain", II–37–II–90 Speech research Unit, Defence research Agency, St. Andrews Road, Malvern, U.K., 1993.

V. Raman et al., Nyex, "Robustness Issues and Solutions in Speech Recognition Based on Telephony Services", IEEE 1997, pp. 1523–1526.

* cited by examiner

GAIN AND NOISE MATCHING FOR SPEECH RECOGNITION

REFERENCE APPLICATION

This application is a continuation application of U.S. patent application Ser. No. 09/226,535 filed on Jan. 6, 1999, now U.S. Pat. No. 6,466,906 Oct. 15,2002.

FIELD OF THE INVENTION

The present invention relates to speech recognition generally and to speaker dependent recognition in the presence of noise, in particular.

BACKGROUND OF THE INVENTION

Speech recognition in noisy environments is a well studied, yet difficult task. One such task is characterized by the following parameters:

1. The recognition is speaker dependent, where the reference templates are created from speech utterances, spoken by the user in a designated "training session";
2. It is desired to minimize the number of training utterances to a small number (1–3), for which it is known in the art that a dynamic time warping (DTW) matching algorithm works better than a hidden markov model (HMM) algorithm;
3. The phrases to be recognized are isolated words;
4. The training phase is relatively noise-free, whereas the recognition needs to cope with additive environmental noise;
5. The environmental noise is unknown to the system prior to the instant the user pushes a push to talk (PTT) button and starts speaking;
6. The environmental noise has both stationary and non-stationary components; and
7. The system has limited fast-access memory, so that it is impossible to run DTW matching against all reference templates, in real-time and in a word-spotting manner. Therefore a two-stage processing is required, where the first stage is a voice activity detector (VAD), and the second stage is a DTW matcher.

Two difficulties imposed by the noise in the recognition phase are:

1. Mismatch in the acoustics between the training and recognition phases; and
2. Inaccurate VAD estimates of the word endpoints in the recognition phase.

These two problems lead to recognition errors.

There are many techniques known in the art to deal with the acoustic mismatch problem. A good review can be found in Jean-Claude Junqua and Jean-Paul Haton, *Robustness in Automatic Speech Recognition*, Kluwer Academic Publishers, 1996. One technique is described in U.S. Pat. No. 5,778,342 to Erell et al.

The problem of inaccurate endpoints has been less covered in the art. One solution was given in the form of relaxed-endpoint DTW and is described in the following: Lawrence Rabiner and Biing-Hwang Juang, *Fundamentals of Speech Recognition*, Prentice Hall, 1993; Ilan D. Shallom, Raziel Haimi-Cohen and Tal Golan, "Dynamic Time Warping with Boundaries Constraint Relaxation", *IEEE Conference in Israel*, 1989, pages 1–4; and U.S. Pat. No. 5,732,394 to Nakadai et al.

Figure 1A:
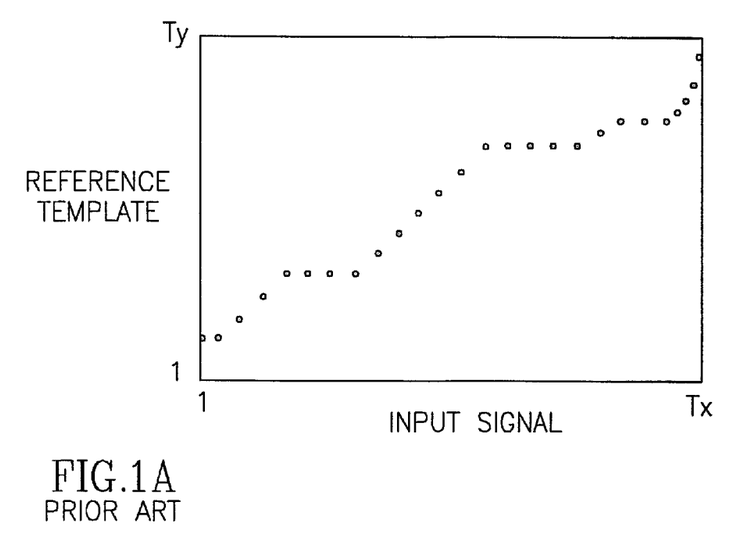
FIGS. 1A and 1B and 2 are graphical illustrations of three different, prior art dynamic time warping (DTW) operations.

In normal DTW, a sequence of spectral parameters from the speech start to end point is stored as an input speech pattern. The DTW operation matches the unknown speech pattern with the content of each reference template and calculates a distance measure between them. This is performed using the graph of FIG. 1A, to which reference is now briefly made. The frames of the input speech pattern are placed on the X axis and those of the current reference pattern are placed on the Y axis. A path is made through the graph, starting at the lower left corner and ending at the upper right corner, where the corners are defined as the endpoints of the test and reference utterances.

Figure 1B:
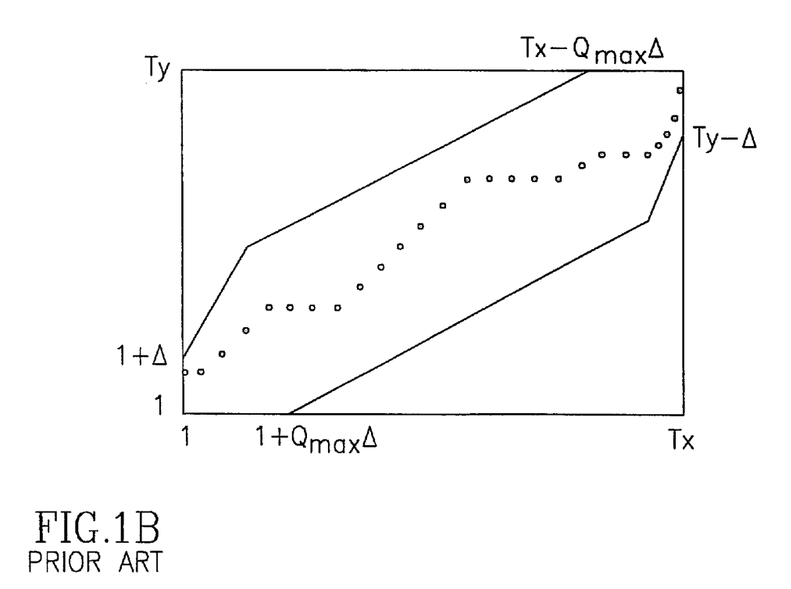

However, in the relaxed-endpoint solution, shown in FIG. 1B to which reference is now made, the DTW paths are not constrained to start or end at the exact endpoints of the test and reference utterances. Instead, paths can start or end within a given range (delta and $Qmax\_delta$) of the corners. This method indeed eliminates some of the errors due to inaccurate endpoints.

Figure 2:
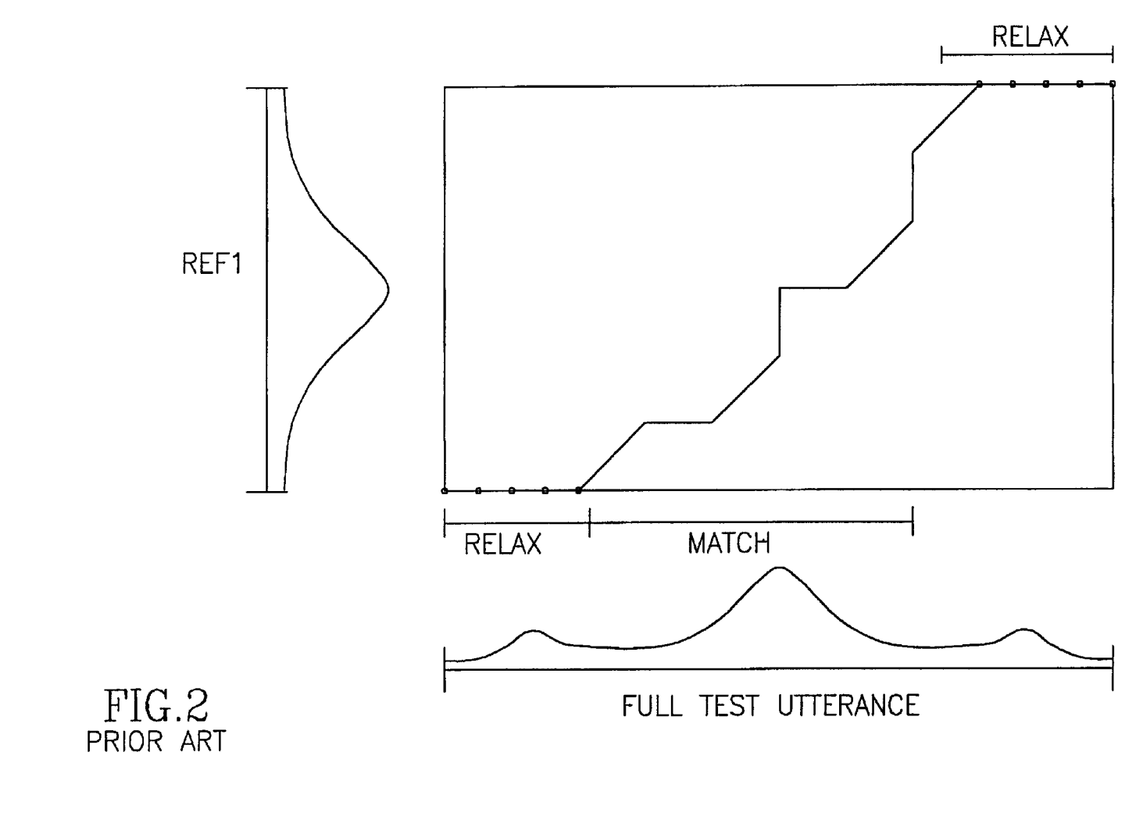

However, the relaxed-endpoint solutions have several disadvantages. One disadvantage is illustrated in FIG. 2, to which reference is now briefly made: when there exist two vocabulary words, and one word is similar to a part of the second word (this is shown by the section marked "match"), the recognition system might incorrectly indicate that utterance of the first (longer) word matches the reference template of the second (shorter) word.

Other disadvantages of the relaxed-endpoint methods are specific to the method. For example, in the article by Shallom, it is necessary to normalize, for each point on the DTW grid, the DTW accumulated score by the path length, since the relaxation of the beginning point allows now for multiple paths of different lengths. The length normalization introduces an extra computation load that does not exist in standard DTW. Also, because of the normalization, the standard DTW solution for the best matching path is in fact not optimal. For example, in U.S. Pat. No. 5,732,394, there is a higher computation load since several DTW matches are performed for each pair of test and reference patterns, instead of one.

Another solution to the problem of inaccurate endpoints is given in the following articles: Tom Claes and Dirk Van Compernolle, "SNR-Normalization for Robust Speech Recognition", *ICASSP* 96, 1996, pages 331–334; Vijay Raman and Vidhya Ramanujam, "Robustness Issues and Solutions in Speech Recognition Based Telephony Services", *ICASSP* 97, 1997, pages 1523–1526; and Olli Viikki and Kari Laurila, "Noise Robust HMM-Based Speech Recognition Using Segmental Cepstral Feature Vector Normalization", *ESCA—NATO Workshop on Robust Speech Recognition for Unknown Communication Channels*, 1997, pages 107–110.

The approach in these publications is that of a single-stage HMM-based system, running in real-time on the input speech, without a VAD. To deal with the noise segments, the HMM model of the word is concatenated on both ends with HMM model of the noise, to form a composite model of the whole utterance.

The above solution has two disadvantages: (a) This solution cannot be applied to tasks that are constrained by items (2) and (7) above; and (b) the one-pass solutions lose some of their efficiency in dealing with the acoustic mismatch (problem 1) since in one-pass algorithms there is no accurate information of the noise level. This occurs because the word endpoints are not determined prior to the recognition and therefore, the noise cannot be estimated from speech-free segments. This inaccurate noise estimate leads to recognition errors.

Another prior art method that also uses concatenated noise-speech-noise models for a DTW-based system is proposed in the article by B. Patrick Landell, Robert E. Wohlford and Lawrence G. Bahler entitled "Improved Speech Recognition in Noise", ICASSP 86, TOKYO, 1986, pages 749–751. Again, the idea is to avoid the use of endpoints in the DTW matching by using noise-templates that are augmented to the speech templates and matching the whole utterance to the concatenated templates. Also, to efficiently combat the acoustic mismatch problem, it is assumed that, prior to the beginning of the utterance, the system has knowledge of the noise, so that the reference templates can be adapted to the noise prior to the beginning of the matching process.

No details are given in the Landell et al. article for how the noise templates are constructed and how to implement the DTW matching against the concatenated noise-speech-noise templates. Unlike with HMM, where the method is straightforward, this is a non-trivial problem in DTW since the DTW alignment constraints are tight but yet there is no accurate knowledge of noise template duration, since it is not known when the speaker utters the word after pushing the PTT.

Also, the Landell et al. article assumes that the noise acoustic features can be estimated from past observations of the noise, from before the speaker pushed the PTT button. For Landell et al.'s system, which was designed for an air force cockpit where the noise is fairly constant, this might be sufficient. However, with variable noise such as encountered during, for example, regular use of mobile phones, this past estimate can be inaccurate and can lead to recognition errors.

In all speech recognition applications, e.g., in voice-dialing by name, it is very important to reject utterances that are either not hi the vocabulary, or are so badly pronounced that they yield erroneous recognition. This is usually done by setting a threshold to the recognition score (e.g., the DTW or IMM score), i.e., the recognition result is accepted oily if the score is significant enough relative to the threshold.

It is generally difficult to achieve efficient rejection of out-of-vocabulary or mispronounced utterances, without sacrificing also some rejection of in-vocabulary, well-pronounced utterances. The problem is difficult because of the high variability in the values of the best-match scores. Methods that are known in the alt for improving the rejection capability of HMM systems include mostly the usage of a "general speech" template (these are discussed in the previously mentioned article by Raman, in U.S. Pat. No. 5,732,394 and in the article by Richard C. Rose and Douglas B. Paul, "A Hidden Markov Model Based Keyword Recognition System", ICASSP '90, 1990, page 129. Alternatively, as discussed in the article by Herve Bourlard, Bait D'hoore, and Jean-Marc Boite, "Optimizing Recognition and Rejection Performance in Wordspotting Systems", ICASSP '94, 1994, page 1–373, the rejection capability can be improved by using as threshold other competing candidate patterns.

Even when such score-normalization methods are efficient to the extent that the variability due to the specific utterance is minimized, there still remains a problem due to the variability in the environment. The matching between the test-utterance and the templates is always worse in noisy conditions relative to the matching in quiet conditions. This creates a problem for the rejection mechanism. Suppose that the rejection threshold on the normalization score is set to an optimal compromise between rejection of out-of-vocabulary words and misdetection of in-vocabulary words for quiet conditions. Then it might happen that in noisy conditions this compromise is not optimal. For example, the number of misdetections of in-vocabulary words will significantly increase. It may be desired in this case to relax the threshold, thereby to reduce the number of misdetections of in-vocabulary words, even at the expense of less rejection of out-of-vocabulary words.

A solution to the problem is to adapt the threshold to the acoustic conditions, e.g., make the threshold a function of the signal to noise ratio, as in U.S. Pat. No. 5,778,342. This solution requires the estimation of the noise from speech-free waveform segments, which, in turn requires knowledge of the speech end points, which are not known to a sufficient precision. For example, if the interfering noise is a short burst that is partially overlapping with the speech, the burst may have been erroneously identified by the VAD as part of the speech. Then, the signal beyond the endpoints will not contain the noise burst, and the SNR estimator will overestimate the SNR, leading to a badly-adapted rejection threshold.

Another source of score-variability occurs in speaker dependent systems which allow the user to register either one word or two connected words. For example, in Voice Activated Dialing by name, a user may register either a first name, last name, or a full name. In the first two cases, the utterance contains one word, whereas in the second case it contains two words. It is typically the case that two-word utterances have more variability in their pronunciation (e.g. the duration of the pause in between may vary significantly), so that the DTW or HMM matching scores typically differ than the ones encountered with one-word utterances. For example, with a standard DTW system, the score is typically higher for two-word utterances. (This statement is true even through the DTW scoring normalizes the accumulated score by the DTW path length, which is longer for two-word utterances than for one-word.) This creates a problem for the rejection mechanism, since two-word utterances are rejected more than one-word utterances. This over-rejection is not "justified" from the performance point of view, since out-of-vocabulary two-word utterances are less likely to be accepted than one-word utterances.

BRIEF DESCRIPTION OF THE DRAWINGS

The present invention will be understood and appreciated more fully from the following detailed description taken in conjunction with the appended drawings in which.

DETAILED DESCRIPTION OF THE PRESENT INVENTION

Figure 3:
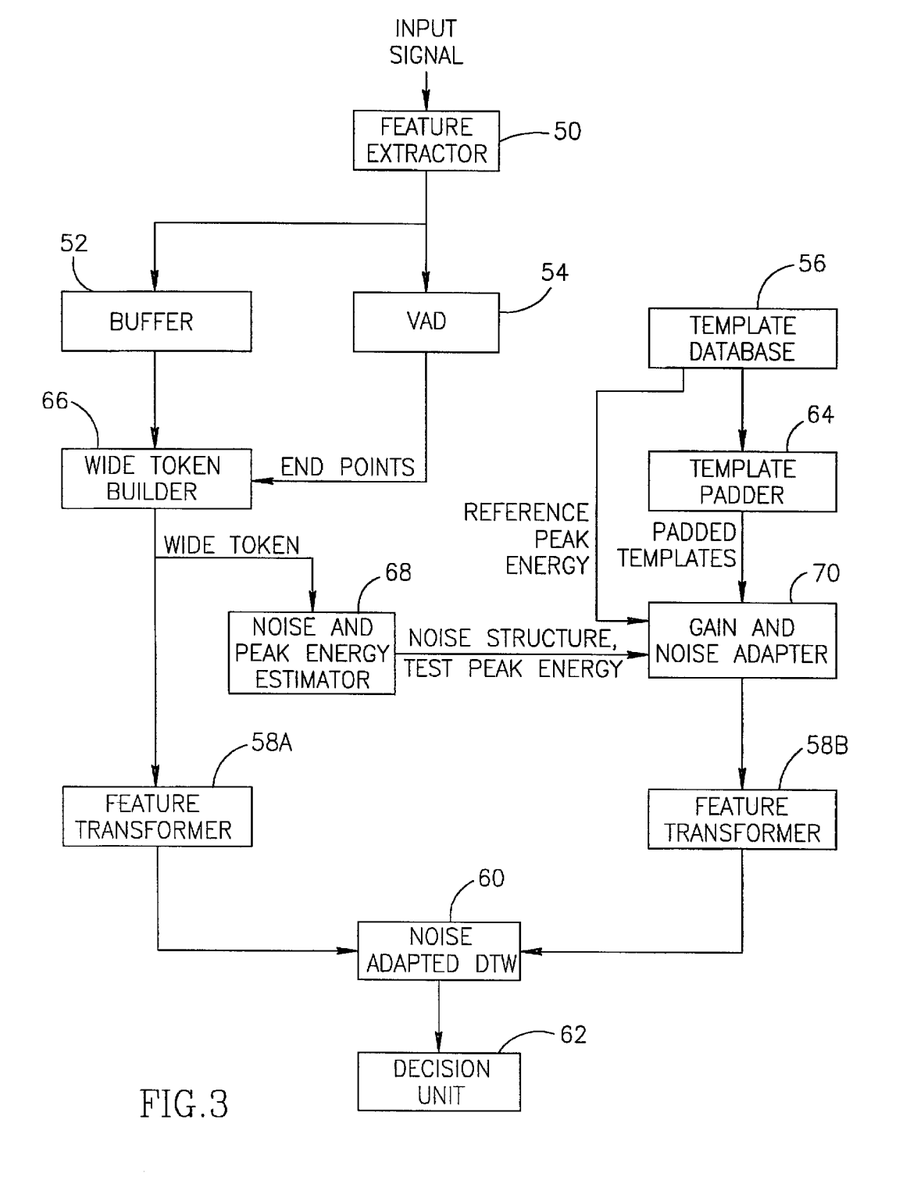
FIG. 3 is a block diagram illustration of a speech recognizer, constructed and operative in accordance with some embodiments of the present invention.

Reference is now made to FIG. 3 which illustrates the system of the present invention. The system comprises a feature extractor 50, a feature buffer 52, a voice activity detector (VAD) 54, a template database 56, two feature transformers 58A and 58B, a comparison unit 60 and a decision unit 62. In accordance with a preferred embodiment of the present invention, the comparison unit 60 is a noise adapted, dynamic time warping (DTW) unit and the system additionally comprises a template padder 64, a wide token builder 66, a noise and peak energy estimator 68 and a gain and noise adapter 70, all of which are described in more detail hereinbelow.

In operation, the feature extractor 50 extracts features, such as autocorrelation coefficients or filterbank energies, of each frame of the input signal and provides these to the voice activity detector 54 and the buffer 52. The buffer 52 stores the features of each frame in frame order, maintaining a history of the frames for a predetermined length of time. The voice activity detector 54 can be any suitable detector, such as the one in the G729B silence compression scheme dated November 1996, which can determine the frames at which speech begins and ends. These endpoints are provided to the wide token builder 66 which extracts a wide token from the buffer 52.

Figure 4:
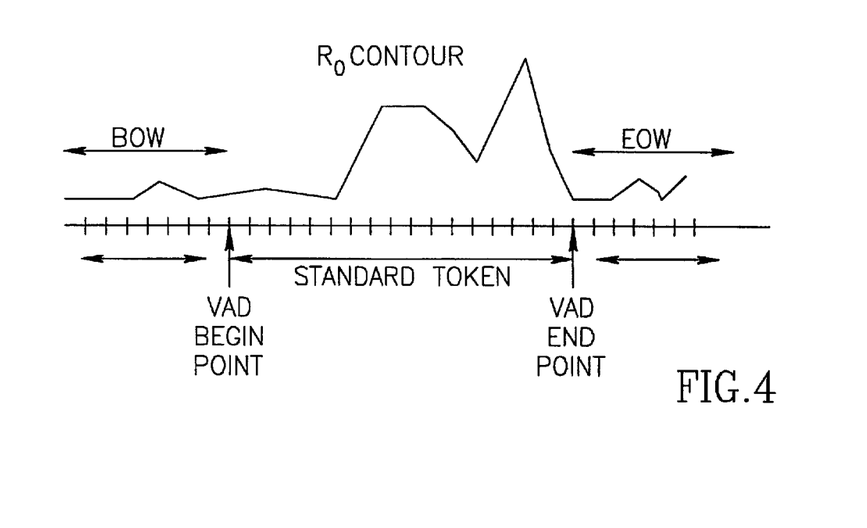
FIG. 4 is a graphical illustration of the energy in a test utterance, useful in understanding the operation of the present invention.

FIG. 4, to which reference is now briefly made, illustrates the data stored in buffer 52. Specifically, FIG. 4 graphs the first autocorrelation coefficient per frame and indicates the endpoints indicated by the voice activity detector 54. A standard token is defined as the set of frames between the endpoints. In accordance with a preferred embodiment of the present invention, wide token builder 66 additionally takes X frames from either side of a standard token, where X is typically 8. Thus, the wide token comprises X frames before the VAD begin point through X frames after the VAD end point. The additional external frames are utilized to overcome any errors made by the voice activity detector 54, in particular those errors arising from inaccurate VAD estimates of endpoints.

Referring back to FIG. 3, the wide token is provided both to feature transformer 58A and to the noise and peak energy estimator 68. The feature transformer 58A transforms the features of the wide token to the cepstral features required by the DTW unit 60. The transformations from one type of features to another type are well known and, therefore, will not be further discussed herein.

The noise and peak energy estimator 68 determines the noise structure and peak energy levels in the wide token. This is provided to the gain and noise adapter 70 in order to provide the noiseless templates with a noise structure and gain level similar to that found in the wide token.

Figure 5A:
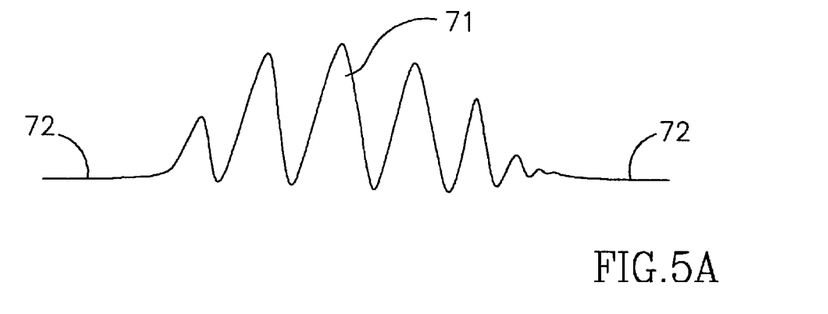
FIG. 5A is a graphical illustration of a test utterance and two extra, blank frames, useful in understanding the operation of the present invention.
Figure 5B:
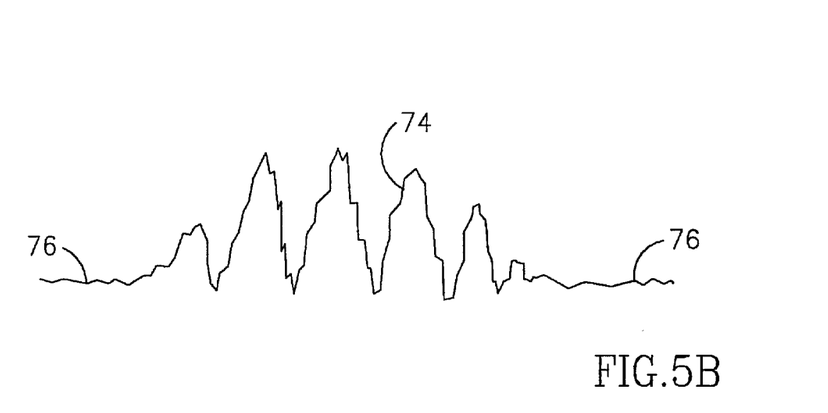
FIG. 5B is a graphical illustration of a noise adapted version of the signal of FIG. 5A, useful in understanding the operation of the present invention.

In accordance with a preferred embodiment of the present invention, the noiseless templates are padded with one blank frame oil either end prior to adapting them with the appropriate gain level and noise structure; this is performed in the template padder 64. The padding and adaptation operations are shown in FIGS. 5A and 5B to which reference is now briefly made. FIG. 5A shows the signal 71 represented by a noiseless template with blank frames 72 (having no signal therein) on either end of signal 71. After noise and gain adaptation, the clean signal 71 becomes noisy signal 74 and the blank frames 72 become noisy frames 76. The gain level is typically also changed to match that of the wide token.

Referring back to FIG. 3, the wide and noise/gain adapted templates are provided to feature transformer 58B for converting to the cepstral features required by the DTW unit 60. The latter compares the representation of the wide token with the representation of each wide and noise/gain adapted template and provides a score for each comparison. The result is provided to the decision unit 62 which then determines which comparison was the best, by some measure.

Figure 6:
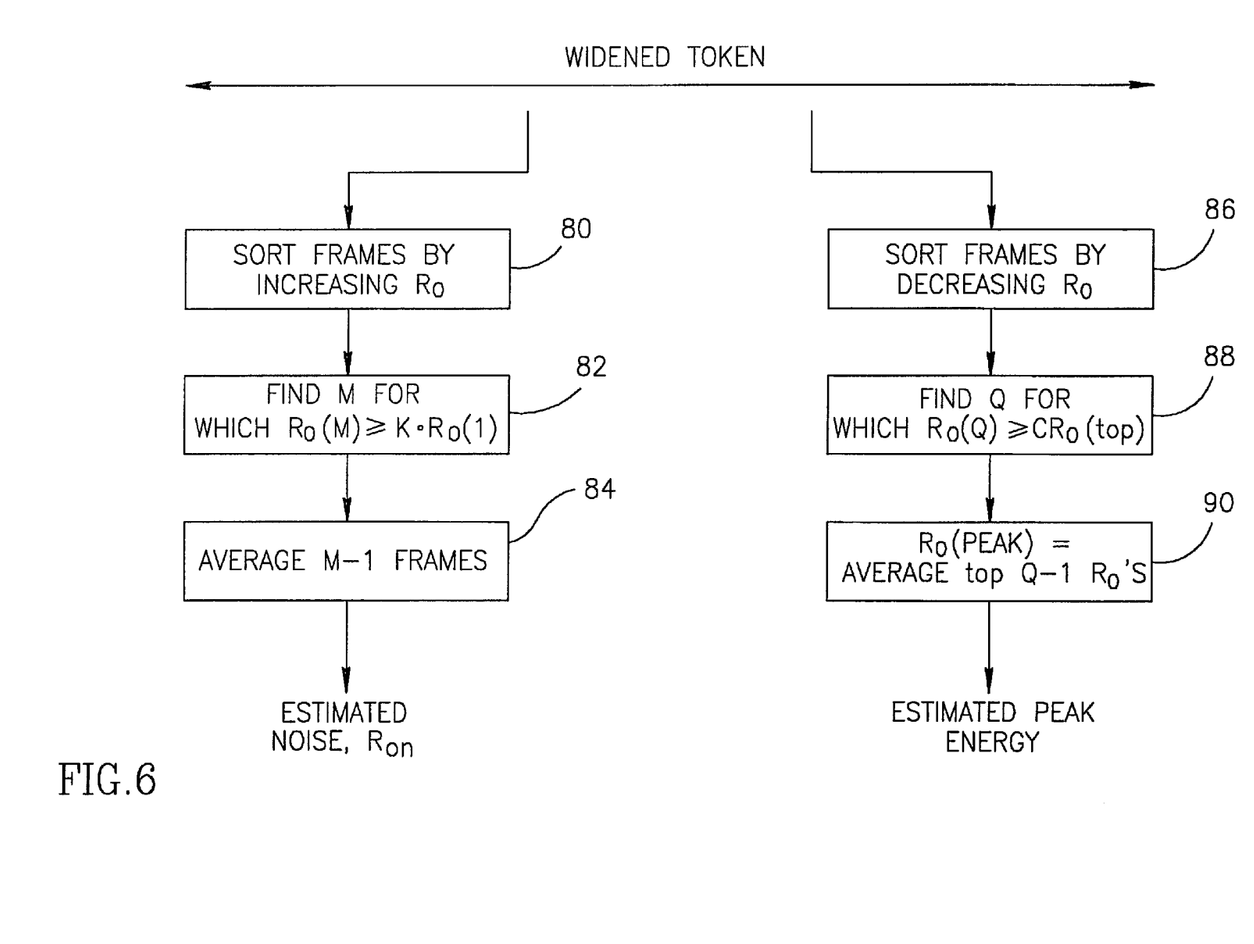
FIG. 6 is a block diagram illustration of a noise and peak energy estimator forming part of the system of FIG. 3.

Reference is now made to FIG. 6 which details the operation of an exemplary noise and peak energy estimator 68. Any suitable energy and noise structure estimate can be utilized; the method shown in FIG. 6 assumes that tie features of each frame are autocorrelation coefficients, where the first coefficient is labeled $R_0$ and indicates the energy level in the frame.

To determine the noise structure, only the frames of the wide token having the lowest energy are considered and they are used to compute an average noise feature. To find the frames with the lowest energy, the frames are sorted by increasing energy value $R_0$ (step 80) and the N frames having the lowest energy values $R_0$ are stored in order based on their energy values, from lowest to highest. N is typically 10. The N frames are then reviewed (step 82), starting from the first one having the lowest energy value $R_0$ and moving upward until reaching a frame M having an energy level which is larger than the lowest energy value by more than a predetermined factor K, such as 3 dB. Mathematically this is stated as:

$$\text{find } M \text{ for which } R_0(M) \geq KR_0 \qquad (1)$$

The noise feature is then determined (step 84) from the first M−1 autocorrelation vectors (i.e. of frame 1 to frame M−1). For example, the M−1 autocorrelation vectors can be averaged together. The noise energy $R_{0n}$ is then determined from the resultant noise feature.

The peak energy estimation is determined in a similar manner but considering the frames with the highest energy. To find the frames with the highest energy, the frames are sorted by decreasing energy value $R_0$ (step 86) and the top N are then reviewed (step 88), starting from the top one, $R_0(top)$, having the highest energy value and moving downward until reaching a frame Q having an energy level which is smaller than the highest energy value by more than a predetermined factor C, such as 0.5 dB. Mathematically this is stated as:

$$\text{find } Q \text{ for which } R_0(Q) \leq CR_0(top)$$

The peak energy $R_0(peak)$ is then determined (step 90) as the average of the top Q−1 energy values $R_0$. It is noted that this operation produces the test peak energy $R_{0t}$ of the widened test token. A similar operation is performed, typically off-line, for each reference template, producing the reference peak energies $R_{0r}$. The latter are stored in template database 56 (FIG. 3)

Referring back to FIG. 3, the gain and noise adapter 70 uses the noise feature and the test and reference peak energies $R_{0t}$ and $R_{0r}$, respectively, to adapt the padded, noiseless templates. An exemplary transformation using average, not peals energy, is described in U.S. Pat. No. 5,778,342 for the case where the features are autocorrelation function (ACF). For the present invention, this transformation is:

$$R'_r = (\langle R_{0t} \rangle - \langle R_{0n} \rangle)/\langle R_{0r} \rangle \times R_r + \langle R_n \rangle$$

where:

$R_r$=Reference ACF vector [$R_0 \ldots R_{10}$]

$\langle R_n \rangle$=Estimated Noise ACF vector $<R_{0t}>$=Estimated Test Peak energy
$<R_{0r}>$=Estimated Reference Peak energy
$<R_{0r}>$=Estimated Noise energy=$<R_n(0)>$
$R'_r$=Noise and Gain adapted Reference ACF vector [$R'_0 \ldots R'_{10}$]

Other transformations can be employed for where the features are filterbank energies, as is discussed in the article "Noise Masking in a Transform Domain", by B. A. Mellor and A. P. Varga, ICASSP '93, 1993, pp. II-87-II-90 and in U.S. Pat. No. 4,933,976.

It will be appreciated that the above equation performs gain adaptation along with the noise adaptation, where the reference template receives a peak energy level equivalent to the test peak energy less the noise energy ($R_{0t}$-$R_{0n}$), normalized by the reference peak energy $R_{0r}$. If desired, the gain adaptation can be performed separately, or not at all.

Figure 7:
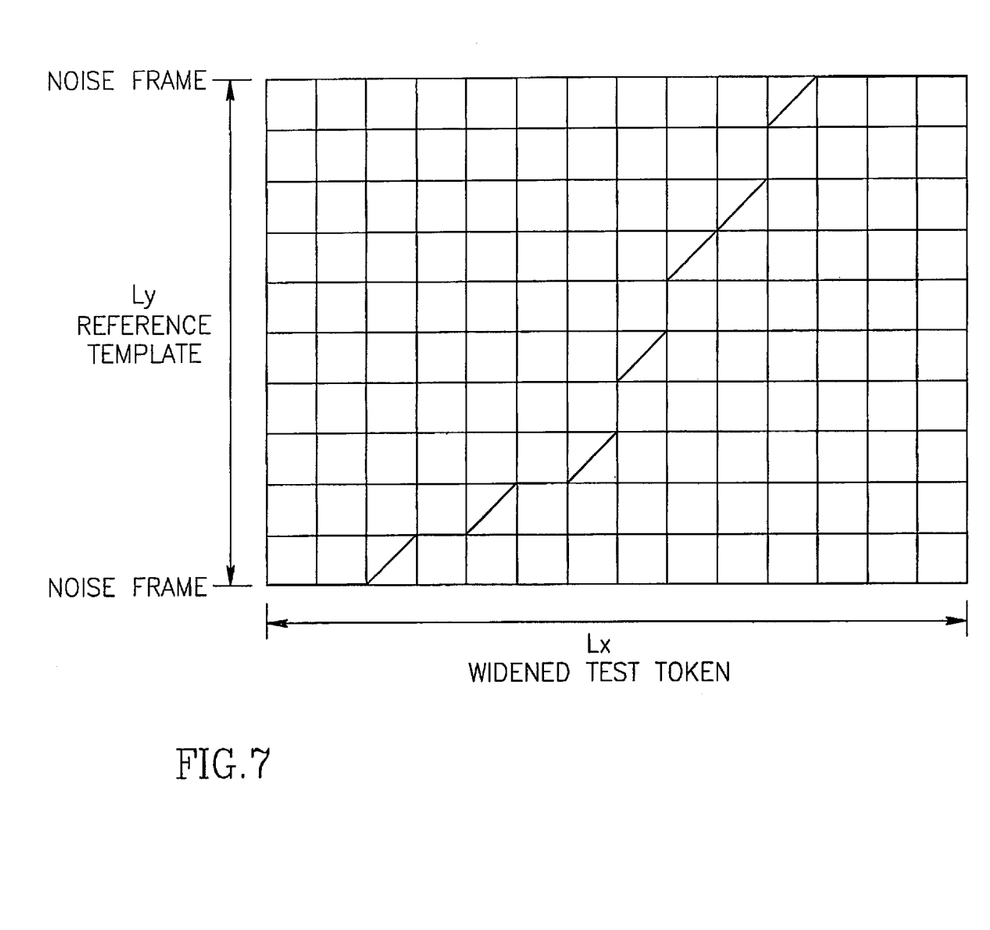
FIG. 7 is a graphical illustration of the noise adapted DTW operation of the present invention.

The noise adapted DTW unit 60 compares a widened test utterance, which includes both speech and noise from both sides, with a noise adapted template. FIG. 7, to which reference is now made, illustrates the DTW grid and a sample path. The first and last reference frames (on the Y axis) are "noise" frames, estimated from the low-energy frames of the test utterance and the widened token is on the X axis.

Wherever the path compares a test token frame against a non-noise frame, the present invention performs the standard DTW operation using standard alignment constraints. However, wherever the comparison is to a reference noise frame, there are no duration constraints. This means that the path can move only horizontally to the right an unlimited number of frames or diagonally to the right one frame and up one frame. This arrangement puts no constraints on how many frames at the edges of the widened test can be aligned against the noise frames.

The score w_score for the reference template is the accumulated score of the winning path, including the noise frames, normalized by full path length, as standard in DTW. A speech score, called the Epd_Score, is the accumulated score of the portion of the winning path which refers to the speech frames only (i.e. not including the noise frames), normalized by the length of the path which only compares speech frames.

Referring back to FIG. 3, the decision unit 62 determines the best match based on the DTW scores w_score of the whole path where the best template Best_Template is defined as the one for which the score is minimal. However, the best template may not provide a good result. Thus, the decision unit 62 additionally determines whether to accept or reject the result, based on the speech score Epd_Score of the best matching template, the average score to all the other templates, and on correction terms that are functions of the test utterance SNR and its length, as refined by the best template.

Figure 8A:
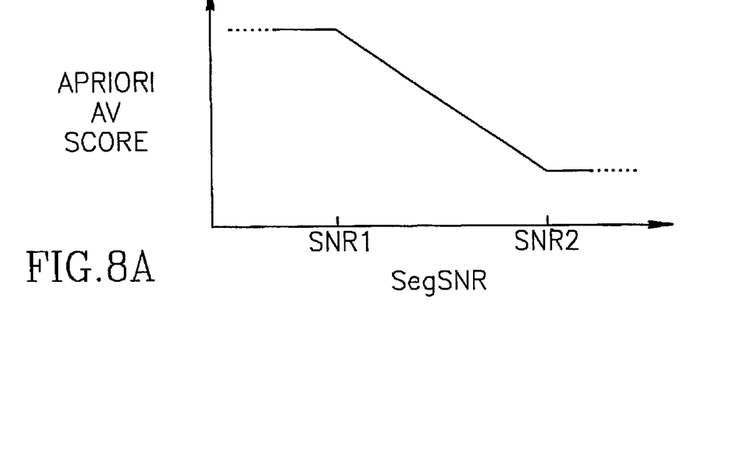
FIGS. 8A, 8B and 8C are graphical illustrations of an a priori average score, SNR correction and length correction curves, useful in understanding the operation of the present invention.

The dependence on the average score to all the other templates is by way of normalization, i.e. the Epd_Score has to be significantly smaller than the average score. In that sense, the average score acts as a model of general speech, similar to that used in state of the art HMM systems. If the vocabulary of templates is large enough, the average score is a good representative of a score to a general speech template. However, in speaker dependent recognition systems with user-created vocabularies, there might be only a few words in the vocabulary and therefore, the average score to all the other templates is not a good representative of a general speech template. For this purpose, the average score is computed as a mixture of an a priori value, determined by simulations, and the actual average score. This mixture prevents the possibility of an abnormally small or large average score. The a priori average score, shown in FIG. 8A to which reference is now briefly made, is a function of a segmental SNR SegSNR, where this function is determined by simulation over a large data base. FIG. 8A shows that the a priori average score falls as the segmental SNR increases.

The segmental SNR is the signal to noise ratio of the test utterance between the DTW-derived endpoints as determined from the match to the best template Best_Template. Specifically, the endpoints are those test-utterance frames on the DTW path to the best template Best_Template, where the path enters the first (or exits the last) reference speech frames. The segmental SNR SegSNR is the average log-energy of the test utterance between the DTW-derived endpoints less the average log-energy of the test utterance outside the endpoints.

The accept/reject algorithm accepts the best match result if the normalized score Norm_Score is less than a threshold level Th. The normalized score is defined as the ratio of the best score Best_Score to the average score Av_Score corrected by two corrections, one for signal to noise (SNR_corr) and one for length (length_corr), as follows:

$$\text{Norm\_Score} = \text{Best\_Score}/\text{Av\_Score} - \text{SNR\_corr} - \text{length\_corr}$$

The best score is the value of Epd_Score for the best template Best_Template.

The average score is based on two values: a_priori_av_score(SegSNR) and Sum_Score. The a priori average score is selected from the a priori average score function of FIG. 8A using the segmental SNR value SegSNR and the Sum_Score is the stun of the speech score Epd_Score for the P templates of words of the vocabulary which are not the matched word of the best template. Thus, the best template and the other templates uttering the same word as the best template are not used to generate Sum_Score.

Specifically, the average score is defined as:

$$\text{Av\_Score} = (w1(\text{a\_priori\_av\_score}(\text{SegSNR}) + \text{Sum\_Score})/(w1+P)$$

where w1 is a weight for the a_priori av_score.

Figure 8B:
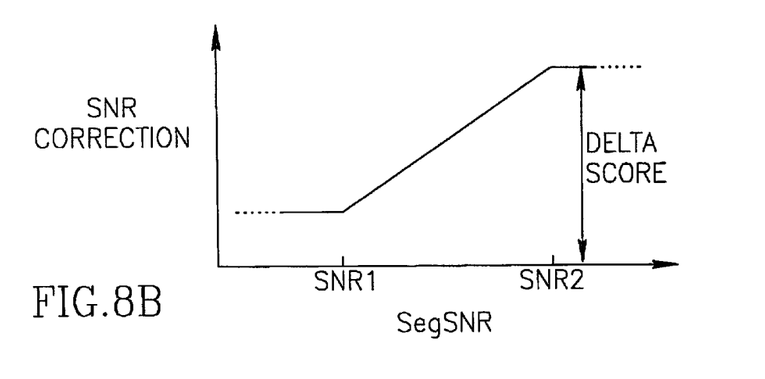

The SNR correction SNR_corr is a piecewise linear function of segmental SNR, controlled by parameters. The parameters SNR1 and SNR2 are determined experimentally from the large speech database. The parameter "Delta Score" is left as an adjustable parameter, to be tailored to a specific application. For example, if delta_score is set to zero, there is no SNR correction at all. In this case, the rejection of out-of-vocabulary words at noisy conditions will be as effective as in quiet conditions, at the expense of a dramatic increase in rejections of in-vocabulary words. At the other extreme, the "Delta Score" can be set to such a value that the rejection rate of in-vocabulary words at noisy conditions will be similar to the rate at quiet conditions, at the expense of fewer rejections of out-of-vocabulary words. The most preferable alternative is to use an intermediate value that compromises between the two contradicting demands.

Figure 8C:
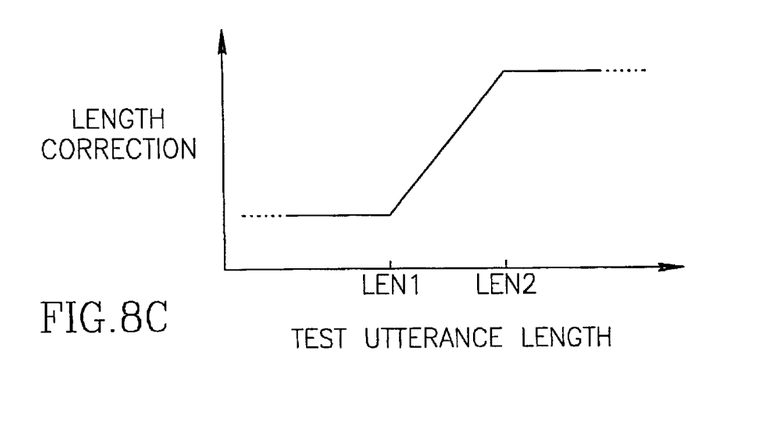

The length correction length colt is a piecewise linear function, shown in FIG. 8C to which reference is now briefly made, of test-utterance length, controlled by parameters. The parameters are determined experimentally from the large speech database used for determining all of FIG. 8.

It will be appreciated by persons skilled in the art that the present invention is not limited by what has been particularly shown and described herein above. Rather the scope of the invention is defined by the claims that follow:

What is claimed is:

1. A method comprising:

modifying a reference template for use in speech recognition by matching a gain and a noise of the reference template according to a peak energy level and an average noise energy level of a widened token.

2. The method of claim 1, wherein modifying a reference template comprises:

modifying the reference template to provide a modified reference template having a peak energy level of substantially equivalent to the difference between the peak energy level and the average noise energy level of the widened token.

3. The method of claim 2 further comprising:

providing a noise-adapted reference template by adjusting the modified reference template with noise qualities of the widened token.

4. The method of claim 3 wherein adjusting comprises:

adding the noise qualities of the widened token to a blank frame of the modified reference template; and adding the noise qualities of the widened token to a speech frame of the modified reference template.

5. The method of claim 3 further comprising:

performing a noise adapted dynamic time warping (DTW) operation including comparing the widened token to the noise adapted reference template.

6. An apparatus comprising:

a peak energy estimator able to estimate a peak energy level of a reference template and a peak energy level of a widened token; and a gain and noise adapter able to match a gain and a noise of the reference template according to the peak energy level and an average noise energy level of the widened token.

7. The apparatus of claim 6, wherein the gain and noise adapter is able to provide a modified reference template having peak energy level substantially equivalent to the difference between the peak energy level and the average noise energy level of the widened token.

8. The apparatus of claim 7 wherein the gain and noise adapter is able to add to the modified reference template noise qualities of the widened token.

9. The apparatus of claim 6, wherein the peak energy estimator comprises a peak energy averager to average energy levels of high energy frames of said widened token.

10. An apparatus comprising:

a G729B voice activity detector to detect voice endpoints of a widened token;

a peak energy estimator adapted to estimate a peak energy of a reference template and a peak energy of the widened token;

a gain and noise adapter to match a gain and a noise of the reference template according to the peak energy level and an average noise energy level of the widened token; and a dynamic time warping (DTW) unit to compare between the widened token and the reference template.

11. The apparatus of claim 10, wherein the gain and noise adapter is able to provide a modified reference template having a peak energy level substantially equivalent to the difference between the peak energy level and the average noise energy level of the widened token.

12. The apparatus of claim 11 wherein the gain and noise adapter is able to add to the modified reference template noise qualities of the widened token.

13. The apparatus of claim 10, wherein the peak energy estimator comprises a peak energy averager to average energy levels of high energy frames of said widened token.

14. An article comprising a storage medium having stored thereon instructions that when executed result in:

modifying a reference template for use in speech recognition by matching a gain and a noise of the reference template according to a peak energy level and an average noise energy level of a widened token.

15. The article of claim 14, wherein the instructions when executed further result in:

providing a modified reference template having a peak energy level substantially equal to the difference between the peak energy level and the average noise energy level of the widened token.

16. The article of claim 14, wherein the instructions when executed further result in:

providing a noise adapted reference template by adjusting the modified reference template with noise qualities of the widened token.

17. The article of claim 16, wherein the instructions when executed further result in:

adding the noise qualities to a blank frame of the modified reference template; and adding the noise qualities to a speech frame of the modified reference template.

18. The article of claim 14, wherein the instructions when executed further result in:

performing a noise adapted dynamic time warping (DTW) operation by comparing between the widened token and the noise adapted reference template.

* * * * *

UNITED STATES PATENT AND TRADEMARK OFFICE
CERTIFICATE OF CORRECTION

PATENT NO. : 6,611,801 B2
DATED : August 26, 2003
INVENTOR(S) : Erell, Adoram

It is certified that error appears in the above-identified patent and that said Letters Patent is hereby corrected as shown below:

Title page,
Item [54], please replace "GAIN AND NOISE MATCHING FOR SPEECH RECOGNITION" with -- SYSTEM AND METHOD FOR RELATIVELY NOISE ROBUST SPEECH RECOGNITION --
Item [74], please replace "*Attorney, Agent or Firm* - Eitan, Pearl, Latzer & Cohen Zedak, LLP." with -- *Attorney, Agent or Firm* - Eitan, Pearl, Latzer & Cohen Zedek, LLP. --

Signed and Sealed this

Twenty-second Day of June, 2004

JON W. DUDAS
*Acting Director of the United States Patent and Trademark Office*